United States Patent [19]
Buswell et al.

[11] Patent Number: 5,360,679
[45] Date of Patent: Nov. 1, 1994

[54] HYDROCARBON FUELED SOLID POLYMER FUEL CELL ELECTRIC POWER GENERATION SYSTEM

[75] Inventors: Richard F. Buswell, Glastonbury; Joseph V. Clausi, Portland, both of Conn.; Ronald Cohen, Boca Raton, Fla.; Craig Louie, Vancouver, Canada; David S. Watkins, Coquitlam, Canada

[73] Assignee: Ballard Power Systems Inc., North Vancouver, Canada

[21] Appl. No.: 110,076

[22] Filed: Aug. 20, 1993

[51] Int. Cl.⁵ .............................................. H01M 8/06
[52] U.S. Cl. ........................................ 429/19; 429/30
[58] Field of Search ...................... 429/19, 20, 17, 34, 429/30, 12

[56] References Cited

U.S. PATENT DOCUMENTS

| | | |
|---|---|---|
| 1,182,759 | 5/1916 | Emanuel . |
| 3,112,229 | 11/1963 | Bacon et al. . |
| 3,311,097 | 3/1967 | Mittelstaedt . |
| 3,404,529 | 10/1968 | Lagerstrom . |
| 3,615,850 | 10/1971 | Chludzinski . |
| 3,909,299 | 9/1975 | Corrigan . |
| 3,972,731 | 8/1976 | Bloomfield et al. . |
| 3,973,993 | 8/1976 | Bloomfield et al. . |
| 3,976,506 | 8/1976 | Landau . |
| 3,976,507 | 8/1976 | Bloomfield . |
| 3,982,962 | 9/1976 | Bloomfield . |
| 4,001,041 | 1/1977 | Menard . |
| 4,004,947 | 1/1977 | Bloomfield . |
| 4,041,210 | 8/1977 | Van Dine . |
| 4,080,487 | 3/1978 | Reiser . |
| 4,120,787 | 10/1978 | Yargeau . |
| 4,128,700 | 12/1978 | Sederquist . |
| 4,190,641 | 2/1980 | Preston, Jr. . |
| 4,333,992 | 6/1982 | Healy . |
| 4,344,849 | 8/1982 | Grasso et al. . |
| 4,344,850 | 8/1982 | Grasso . |
| 4,473,622 | 9/1984 | Chludzinski et al. . |
| 4,539,267 | 9/1985 | Sederquist . |
| 4,820,314 | 4/1989 | Cohen et al. . |
| 5,009,967 | 4/1991 | Scheffler . |
| 5,141,823 | 8/1992 | Wright et al. ..................... 429/19 |

FOREIGN PATENT DOCUMENTS

0359889  3/1990  European Pat. Off. .

Primary Examiner—Anthony Skapars
Attorney, Agent, or Firm—McAndrews, Held & Malloy, Ltd.

[57] ABSTRACT

A power plant system produces utility grade electrical AC power from gaseous or liquid hydrocarbon fuels using a fuel cell stack employing ion exchange membranes. The fuel is desulfurized, mixed with water, heated and vaporized before being introduced into a reformer. The reformer produces a hydrogen-rich gas which is then directed through a series of heat exchangers, shift converters and a selective oxidizer. The processed fuel stream is combined in the fuel cell stack with a pressurized oxidant stream to generate DC power. Oxidant pressure is supplied by compressors driven by turbines using heated system exhaust gases. The DC power is converted into utility grade AC power using an inverter augmented by a battery peaking unit for rapid load following. The water generated in the fuel cell stack is recycled and used to cool the fuel cell stack and to humidify the fuel stream and oxidant stream prior to their introduction to the fuel cell stack. System integration results in an electrical efficiency of at least about 40%, and with heat recovery the overall fuel efficiency is greater than approximately 80%.

13 Claims, 6 Drawing Sheets

| STREAM NUMBER | | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|---|
| STREAM NAME | | | | | | | | | | | | | | | | | |
| COMPONENT | MOL. WT. | LBMOL/HR | LBMOL/HR | LBMOL/HR | LBMOL/HR | LBMOL/HR | LBMOL/HR | LBMOL/HR | LBMOL/HR | LBMOL/HR | LBMOL/HR | LBMOL/HR | LBMOL/HR | LBMOL/HR | LBMOL/HR | LBMOL/HR | LBMOL/HR |
| HYDROGEN | 2.02 | | | | | | 13.71 | 13.71 | 13.71 | 13.71 | 15.74 | 15.74 | 15.87 | 15.87 | 15.82 | 15.82 | |
| METHANE | 16.04 | 4.96 | 4.96 | 4.89 | 4.89 | 4.89 | 0.91 | 0.91 | 0.91 | 0.91 | 0.91 | 0.91 | 0.91 | 0.91 | 0.91 | 0.91 | |
| NITROGEN | 28.01 | | | | | | | | | | | | | | | | 40.66 |
| OXYGEN | 32.00 | | | | | | | | | | | | | | | | 10.81 |
| CARBON MONOXIDE | 44.01 | | | | | | 2.21 | 2.21 | 2.21 | 2.21 | 0.17 | 0.17 | 0.04 | 0.04 | 0.17 | 0.17 | |
| CARBON DIOXIDE | 28.01 | | | | | | 1.77 | 1.77 | 1.77 | 1.77 | 3.81 | 3.81 | 3.94 | 3.94 | 3.97 | 3.97 | |
| WATER | 18.02 | | | | 14.66 | 14.66 | 8.91 | 8.91 | 8.91 | 8.91 | 6.87 | 6.87 | 6.74 | 6.74 | 6.80 | 2.14 | 0.50 |
| TOTAL FLOW | LBMOL/HR | 4.96 | 4.96 | 4.89 | 19.55 | 19.55 | 27.50 | 27.50 | 27.51 | 27.51 | 27.50 | 27.50 | 27.50 | 27.50 | 27.67 | 23.01 | 51.97 |
| MASS FLOW | LB/HR | 70 | 522 | 522 | 335 | 650 | 1370 | 850 | 584 | 380 | 537 | 380 | 390 | 280 | 240 | 185 | 70 |
| TEMPERATURE | FAHRENHEIT | 0 | 100 | 100 | 95 | 92 | 80 | 78 | 77.25 | 76.5 | 74.5 | 73.75 | 71.75 | 71 | 68 | 65 | 0 |
| PRESSURE | PSIG | 1 | 1 | 1 | 1 | 1 | 1 | 1 | 1 | 1 | 1 | 1 | 1 | 1 | 1 | 1 | 1 |
| VAPOUR FRACTION | | | | | | | | | | | | | | | | | |

Fig. 3B

| STREAM NUMBER | | 16 | 17 | 18 | 19 | 20 | 21 | 22 | 23 | 24 | 25 | 26 | 27 | 28 | 29 | 30 | 31 |
|---|---|---|---|---|---|---|---|---|---|---|---|---|---|---|---|---|---|
| STREAM NAME | | | | | | | | | | | | | | | | | |
| COMPONENT | MOL. WT. | LBMOL/HR | LBMOL/HR | LBMOL/HR | LBMOL/HR | LBMOL/HR | LBMOL/HR | LBMOL/HR | LBMOL/HR | LBMOL/HR | LBMOL/HR | LBMOL/HR | LBMOL/HR | LBMOL/HR | LBMOL/HR | LBMOL/HR | LBMOL/HR |
| HYDROGEN | 2.02 | | | | | | | | | 4.13 | | | | | | | |
| METHANE | 16.04 | | | | | | | | | 0.91 | | | | | | | |
| NITROGEN | 28.01 | 40.66 | 40.66 | 40.66 | 39.49 | 0.17 | 39.32 | 39.32 | 39.32 | | 39.49 | 39.49 | 39.49 | 39.49 | 39.49 | 39.49 | 39.49 |
| OXYGEN | 32.00 | 10.81 | 10.81 | 10.81 | 10.50 | 0.05 | 10.46 | 10.46 | 10.46 | | 4.61 | 4.61 | 4.61 | 4.61 | 0.73 | 0.73 | 0.73 |
| CARBON MONOXIDE | 44.01 | | | | | | | | | | | | | | | | |
| CARBON DIOXIDE | 28.01 | | | | | | | | | 3.97 | | | | | | | |
| WATER | 18.02 | 0.50 | 0.50 | 0.50 | 0.48 | 0.00 | 0.48 | 4.24 | 5.29 | 0.87 | 4.24 | 4.24 | 4.24 | 4.24 | 4.89 | 4.89 | 4.89 |
| TOTAL FLOW | LBMOL/HR | 51.97 | 51.97 | 51.97 | 50.48 | 0.22 | 50.26 | 54.02 | 55.07 | 9.89 | 48.34 | 48.34 | 48.34 | 48.34 | 11.05 | 11.05 | 11.05 |
| MASS FLOW | LB/HR | | | | | | | | | | | | | | 56.16 | 56.16 | 56.16 |
| TEMPERATURE | FAHRENHEIT | 251 | 140 | 344 | 344 | 210 | 210 | 177 | 186 | 181 | 181 | 319 | 447 | 650 | 2112 | 1315 | 1166 |
| PRESSURE | PSIG | 20 | 19.3 | 65.25 | 65.25 | 65.25 | 65 | 65 | 65 | 63 | 63 | 62.25 | 61.5 | 60.75 | 60.75 | 59 | 58.25 |
| VAPOUR FRACTION | | 1 | 1 | 1 | 1 | 1 | 1 | 1 | 1 | 1 | 1 | 1 | 1 | 1 | 1 | 1 | 1 |

Fig. 3C

| STREAM NUMBER | | | 32 | 33 | 34 | 35 | 36 | 37 | 38 | 39 | 40 | 41 | 42 | 43 | 44 | 45 | 46 |
|---|---|---|---|---|---|---|---|---|---|---|---|---|---|---|---|---|---|
| STREAM NAME | | | | | | | | | | | | | | | | | |
| COMPONENT | MOL. WT. | LBMOL/HR | LBMOL/HR | LBMOL/HR | LBMOL/HR | LBMOL/HR | LBMOL/HR | LBMOL/HR | LBMOL/HR | LBMOL/HR | LBMOL/HR | LBMOL/HR | LBMOL/HR | LBMOL/HR | LBMOL/HR | LBMOL/HR |
| HYDROGEN | 2.02 | | | | | | | | | | | | | | | | |
| METHANE | 16.04 | | | 0.07 | | | | | | | | | | | | | |
| NITROGEN | 28.01 | | 39.49 | | 1.16 | 40.66 | 40.66 | 40.66 | 40.66 | | | | | | | | |
| OXYGEN | 32.00 | | 0.73 | | 0.31 | 0.89 | 0.89 | 0.89 | 0.89 | | | | | | | | |
| CARBON MONOXIDE | 44.01 | | | | | | | | | | | | | | | | |
| CARBON DIOXIDE | 28.01 | | 4.89 | | | 4.96 | 4.96 | 4.96 | 4.96 | | | | | | | | |
| WATER | 18.02 | | 11.05 | | 0.01 | 11.22 | 11.22 | 11.22 | 10.35 | 0.36 | 0.86 | | | | | | |
| TOTAL FLOW | | LBMOL/HR | 56.16 | 0.07 | 1.49 | 57.72 | 57.72 | 57.72 | 56.86 | 144.5 | 14.66 | 14.66 | 2728 | 2728 | 0.19 | 0.19 | 1.24 | 1.24 |
| MASS FLOW | | LB/HR | 655 | | 344 | 704 | 535 | 388 | 144.5 | | 183 | 311 | 2728 | 2728 | 0.19 | 0.19 | 1.24 | 1.24 |
| MASS FLOW | | LB/HR | 655 | 522 | 344 | 704 | 535 | 388 | 144.5 | | 183 | 311 | 177 | 165 | 186 | 185 | 384 |
| TEMPERATURE | | FAHRENHEIT | 58 | 100 | 65.25 | 56.25 | 17.6 | 0 | 0 | 0 | 150 | 150 | 65 | 65 | 65 | 65 | 100 |
| PRESSURE | | PSIG | 1 | 1 | 1 | 1 | 1 | 1 | 1 | 0 | 0 | 0 | 0 | 0 | 0 | 0 | 1 |
| VAPOUR FRACTION | | | | | | | | | | | | | | | | | | |

Fig. 4

| NAME | 200 KW REFERENCE CASE 16-DEC-91 NG31L7NG31L7 | HEAT EXCHANGERS | HEAT KW |
|---|---|---|---|
| | | EVAPORATOR | 67.6 |
| | | REGENERATOR | 17.5 |
| | | SHIFT PRECOOL | 13.0 |
| NET POWER AC | 200.0 | FW PREHEAT | 10.2 |
| CELL VOLTAGE (VOLTS) | 0.794 | SELOX PRECOOL | 7.0 |
| STACK PRESSURE (PSIG) | 65 | ANODE PRECOOL | 27.5 |
| | | CATHODE PRECOOL | 14.1 |
| HYDROGEN UTILIZATION | 0.739 | COMP INTERCOOL | 11.9 |
| HYDROGEN STOICH | 1.35 | CATHODE VENT PRE | 21.0 |
| AIR UTILIZATION | 0.559 | THERMAL CONTROL | 177.9 |
| AIR STOICH | 1.79 | WATER RECOVERY | 35.6 |
| STEAM/CARBON | 3 | | |
| REFORMER CONVERSION | 0.814 | | |
| AUXBURN FLOW (%) | 1.5 | | |
| | | | |
| GROSS POWER (KW) | 225.9 | | |
| LBMOLS/HR H2 CONSUMED | 11.69 | | |
| LBMOLS/HR CH4 CONSUMED | 4.96 | | |
| NATURAL GAS SCFM | 31.3 | | |
| AIR SCFM | 328 | | |
| STEAM FLOWRATE (LBS/HR) | 268 | | |
| WATER PRODUCED (LBS/HR) | 1 | | |
| | | | |
| POWER/CONTROLLER (KWE) | 4.52 | | |
| POWER/FUEL COMP (KWE) | 7.83 | | |
| POWER AIR COMP (KW) | 41.27 | | |
| (AND TURBINE) | | | |
| EFFICIENCY/COMPRESSOR | 0.8 | | |
| EFFICIENCY/TURBINE | 0.8 | | |
| | | | |
| EFFICIENCY/FPS | 0.707 | | |
| EFFICIENCY/FC | 0.639 | | |
| EFFICIENCY/MECH | 0.942 | | |
| EFFICIENCY/INV | 0.940 | | |
| EFFICIENCY/TOTAL | 0.400 | | |
| | | | |
| WATTS/SQ. FT. | 397 | | |
| ACTIVE AREA (SQ. FT.) | 569 | | |

HYDROCARBON FUELED SOLID POLYMER FUEL CELL ELECTRIC POWER GENERATION SYSTEM

FIELD OF THE INVENTION

The present invention relates generally to a hydrocarbon fueled solid polymer fuel cell system for producing utility grade electrical power. More specifically, the present invention relates to a pressurized fuel cell electric power generation system which converts the chemical energy from gaseous and/or liquid hydrocarbon fuels to electrical energy using a low temperature solid polymer fuel cell stack.

BACKGROUND OF THE INVENTION

Electrochemical fuel cells convert chemical energy derived from a fuel directly into electrical energy by oxidizing the fuel in the cell. Power plants that generate electrical energy from electrochemical fuel cells are of particular interest to utilities because they can provide incremental, dispersed electric power, thus overcoming some of the difficulties associated with conventional nuclear, coal or hydrocarbon fuel power plants, such as access to high voltage transmission lines, distribution to urban power stations, and the substantial financial commitments typically associated with conventional power plants. In addition, electrochemical fuel cell systems are capable of operating at greater than 40% electrical efficiency, and thus produce electrical energy more economically than conventional power plants, while substantially avoiding the so-called "green house" effect. Electrochemical fuel cell power plants are also relatively quiet, and produce minimal emissions. Thus, the disadvantages of environmental pollution, power plant location and regulatory approval are reduced in the case of fuel cell electric power generation systems.

At the present time, fuel cell power plants using liquid phosphoric acid as the electrolyte in the fuel cells are nearest to being commercialized. These power plants include a fuel processing subsystem, a fuel cell electric power generation subsystem, an air supply subsystem, a water cooling/recovery subsystem, a power conversion subsystem, and a control subsystem. The fuel processing subsystem generally incorporates steam reforming of the hydrocarbon fuel to produce the hydrogen-rich gas for the fuel cells. Because the phosphoric acid fuel cells operate at temperatures of about 400° F., the cells are typically cooled by boiling water in coolers and the steam produced is then supplied to the fuel processing subsystem. The use of fuel cell stack waste heat to produce the steam is an efficiency improvement for the fuel processing subsystem in phosphoric acid fuel cell power plant systems because extra fuel does not have to be burned in the fuel processing subsystem to produce the steam. This improvement in fuel processor efficiency means that the phosphoric acid fuel cell electric power generation subsystem can be lower in efficiency to achieve the desired overall power system efficiency. This permits the phosphoric acid fuel cells to operate at lower voltage and hence higher power density.

Solid polymer fuel cells typically operate at about 180° F. This temperature is too low to produce steam for the fuel processing subsystem. A steam generator (vaporizer or evaporator) is therefore incorporated in the fuel processing subsystem of solid polymer fuel cell systems to produce steam. The vaporizer derives energy to convert water to steam from the reformer burner exhaust stream. The energy in the reformer burner exhaust stream to drive the vaporizer is produced by burning extra fuel in the reformer burner. The burning of extra fuel in the reformer burner effectively lowers the efficiency of the fuel processing subsystem in solid polymer fuel cell power plant systems. Thus, in order to compete effectively with phosphoric acid fuel cell power plant systems, solid polymer fuel cell power plant systems must provide increased efficiency in other subsystems to achieve the same overall system electrical efficiency. In the solid polymer fuel cell power plant system disclosed herein, the increase efficiency is provided in the electric power generation subsystem, wherein the fuel cells are operated at a higher voltage than that permitted in the fuel cells of phosphoric acid power plant systems. Because, however, the solid polymer fuel cells in the electric power generation system disclosed herein have extremely favorable performance characteristics, the power density of the solid polymer fuel cells at the higher operating voltages is greater than that of phosphoric acid fuel cells at the lower operating voltage of phosphoric acid power plant systems.

The solid polymer fuel cell electric power generation system disclosed herein comprises the following subsystems: (1) an air pressurization subsystem, (2) a fuel processing subsystem, (3) an electric power generation subsystem, (4) a water recovery subsystem, (5) a power conversion subsystem, and (6) a control subsystem. Atmospheric air is introduced into the air pressurization subsystem, which, in a preferred embodiment, comprises a two-stage turbocompressor. The air stream is cooled between compression stages for efficient compression, pressurized, then humidified using water from the water recovery subsystem before being introduced as the oxidant stream into the electric power generation subsystem.

Natural gas (methane) or liquid hydrocarbon fuel is the raw fuel source introduced into the fuel processing subsystem. The fuel stream is heated (and vaporized if supplied as a liquid) and converted in a steam reformation process, further including shift reactors and a selective oxidizer, into a hydrogen-rich reformate fuel stream. The reformate fuel stream is introduced as the fuel stream to the fuel cell based electric power generation subsystem. The particular components of the fuel processing subsystem are largely dependent upon the type of raw fuel used. In addition to methane (natural gas), the raw fuel source may be methanol, fossil fuels, garbage off-gas, or other hydrogen-containing substances. In a preferred embodiment utilizing natural gas as the fuel, the fuel processing subsystem comprises an electric driven compressor to pressurize the fuel, a preoxidizer catalyst bed to consume oxygen from the fuel, a hydrodesulfurizer to remove sulphur from the fuel, a vaporizer to impart water from the water recovery subsystem to the fuel stream, a regenerator heat exchanger to heat the fuel stream, a steam reformer to produce a hydrogen-rich reformate fuel stream, a regenerator heat exchanger and shift convertor precooler heat exchanger to cool the reformate fuel stream, a shift reactor for converting carbon monoxide in the reformate fuel stream to carbon dioxide and hydrogen, a selective oxidizer precooler heat exchanger, a selective oxidizer to further convert carbon monoxide in the reformate fuel stream to carbon dioxide, an anode precooler, and a water separator to remove water from the reformed fuel stream.

The electric power generation subsystem employs an electrochemical fuel cell stack to oxidize the reformate fuel stream and generate electricity, heat and product water. In a preferred embodiment, the fuel cells comprise a membrane electrode assembly comprising a solid polymer membrane such as DuPont's Nafion brand ion exchange membrane or Dow's experimental ion exchange membrane XUS 13204.10. The ion exchange membrane is disposed between two electrodes formed of porous, electrically conductive sheet material, preferably carbon fiber paper, each having a layer of platinum catalyst disposed at the membrane/electrode interface to render the electrodes electrochemically active. The membrane electrode assembly is typically disposed between graphite flow field plates engraved with flow passages which direct the fuel stream and oxidant stream, respectively, to the adjacent anode electrode and cathode electrode.

At each anode, the hydrogen-rich reformate fuel stream permeates the porous electrode structure of the anode and reacts at the catalyst layer to form cations (hydrogen ions or protons), which migrate through the membrane to the cathode. In addition to facilitating the migration of the cations, the membrane isolates the hydrogen fuel stream from the oxidant stream. At each cathode, the oxygen-containing oxidant stream reacts at the catalyst layer at the cathode/membrane interface to form anions. The anions formed at each cathode react with the cations to complete the electrochemical reaction and form water as a reaction product. The electrodes are electrically coupled to provide a path for conducting electrons between the anode and the cathode through an external load.

The water produced in the electric power generation subsystem is recycled in the water recovery subsystem. Because the solid polymer fuel cell operates at temperatures lower than phosphoric acid electrolyte fuel cells, the water produced in the electric power generation subsystem is readily separated from the fuel cell exhaust stream, without the need for large, expensive condensing equipment. In a preferred embodiment of the present fuel cell electric power generation system, the recycled water is employed (1) as the vaporized water fed to the fuel processing subsystem, (2) as the water for humidification in the air pressurization subsystem, and (3) as the coolant for the fuel cell stack. Another embodiment has a closed coolant loop for the fuel cell stack, with the recycled water employed as the source of water for (1) and (2) above, and a separate stream provides coolant to the fuel cell stack (item (3) above).

One of the advantages of the present system is the location of the humidification function outside the fuel cell stack, thus enabling the fuel cell to be smaller and less costly to manufacture. Because the ability of gases to absorb water vapor varies significantly with temperature, especially at low pressure, it was previously thought that humidification of the fuel and the oxidant should take place within the fuel cell. Humidification within the fuel cell ensures that the humidification takes place at or as close as possible to the operating temperature and pressure of the fuel cell. It has now been found, however, that the performance and lifetime of the system is improved if humidification takes place outside of the fuel cell, where the temperature of the humidification process can be controlled to produce reactant streams having the humidification level most desirable for a given set of fuel cell operating conditions.

In the present system, unreacted hydrogen and oxygen which exits the electric power generation subsystem is exhausted and reused in the fuel processing subsystem and the air pressurization subsystem. Excess water is separated from the reactant exhaust streams, and the exhaust streams are then directed to the burner portion of the fuel processing subsystem, where the energy from the exhaust streams is used to power the reformer. The waste energy from the reformer is in turn used to power the two stage turbocompressor in the air pressurization subsystem and to provide heat for making steam for the fuel processing subsystem.

The electricity produced by the electric power generation subsystem is unregulated DC and is converted into regulated, utility grade AC power by the power conversion subsystem. The power conversion subsystem comprises an inverter for converting the electricity from DC to AC and a battery peaking unit connected to the inverter which supports the fuel cell stack voltage during transient increased demand periods in rapid load-following applications.

It is therefore an object of the present invention to provide an efficient, high power density solid polymer fuel cell electric power generation system that produces utility grade electrical power from gaseous or liquid hydrocarbon fuels.

Another object of the invention is to provide a solid polymer fuel cell electric power generation system that makes productive use of waste energy normally exhausted from conventional systems.

Yet another object of the invention is to provide a solid polymer fuel cell power generation system that competes directly with phosphoric acid fuel cell electric power generation systems by employing a solid polymer fuel cell stack which operates at a higher efficiency than corresponding phosphoric acid fuel cell structures.

A further object of the invention is to provide a solid polymer fuel cell electric power generation system that recycles water generated as a reaction product by the system.

A still further object of the invention is to provide a solid polymer fuel cell electric power generation system that can perform the reactant humidification function outside of the fuel cell stack.

SUMMARY OF THE INVENTION

The above and other objects are achieved by an integrated fuel cell electric power generation system comprising a fuel processing subsystem, an electric power generation subsystem, an air pressurization subsystem, and a water recovery subsystem. The fuel processing subsystem catalytically converts an inlet fuel stream comprising hydrocarbons to a processed fuel stream comprising hydrogen. The fuel processing subsystem comprises an evaporator for vaporizing water to humidify the inlet fuel stream, and a reformer comprising a reformer burner fed by at least one reactant exhaust stream from the electric power generation subsystem. The reformer produces the processed fuel stream and the reformer burner produces a burner exhaust stream.

The electric power generation subsystem comprises a fuel cell stack comprising a plurality of fuel cells and at least one reactant exhaust stream. Each of the fuel cells comprises a cathode, an anode, and an ion exchange membrane disposed therebetween. The anode has a catalyst associated therewith for producing cations from the processed fuel stream. The cathode has a catalyst associated therewith for promoting the reaction of oxygen from a pressurized oxidant stream with the cations to form electricity, water and heat. The at least one reactant exhaust stream comprises either unreacted hydrogen or unreacted oxygen or both.

The air pressurization subsystem comprises a compressor operably connected to a turbine. The turbine is powered by the reformer burner exhaust stream and/or optionally an auxiliary burner exhaust stream. The compressor pressurizes an oxidant stream for feeding the electric power generation subsystem.

The water recovery subsystem recycles the water produced in the fuel cell stack. The water recovery subsystem comprises means for producing a separated water stream by removing water from the at least one reactant exhaust stream, means for supplying a first portion of the separated water stream to the evaporator in the fuel processing subsystem, and means for supplying a second portion of the separated water stream to humidify the pressurized oxidant stream, and, preferably, means for supplying a third portion of the separated water stream to provide a coolant water circulation loop for the fuel cell stack.

In a preferred integrated fuel cell electric power generation system, the water recovery subsystem further comprises:

means for storing the water separated from the power exhaust stream;

means for delivering the separated water from the storing means to the purifying means; and optionally means for purifying the separated water downstream of the storing means.

In another preferred integrated fuel cell electric power generation system, the means for separating the water comprises a first water separator disposed downstream of the anode and upstream of the reformer burner, and a second water separator disposed downstream of the cathode and upstream of the reformer burner.

In still another preferred integrated fuel cell electric power generation system, the system further comprises a contact humidifier associated with the coolant circulation loop for dispersing coolant water into the pressurized oxidant stream prior to introducing the pressurized oxidant stream to the cathode. Such a system preferably further comprises a selective oxidizer disposed downstream of the contact humidifier. The selective oxidizer receives at least some excess coolant water from the contact humidifier to cool the fuel stream processed by the selective oxidizer prior to introducing the processed fuel stream to the anode.

In a further preferred embodiment of the integrated fuel cell electric power generation system, the compressor comprises staged turbines of staged turbocompressors. The turbines are driven at least in part by an auxiliary burner. The auxiliary burner receives the reformer burner exhaust stream, at least a portion of the pressurized oxidant stream, and at least a portion of the inlet fuel stream. The turbocompressors pressurize the oxidant stream.

In a still further integrated fuel cell electric power generation system, the electricity produced from the electric power generation subsystem is converted into utility grade AC power. The conversion means comprises an inverter augmented by a battery peaking unit. In such a preferred system, the battery peaking unit is connected in parallel to the fuel cell to supply power to the inverter when the fuel cell voltage is temporarily decreased below a minimum voltage required by the inverter.

DETAILED DESCRIPTION OF THE PREFERRED EMBODIMENTS

Figure 2:
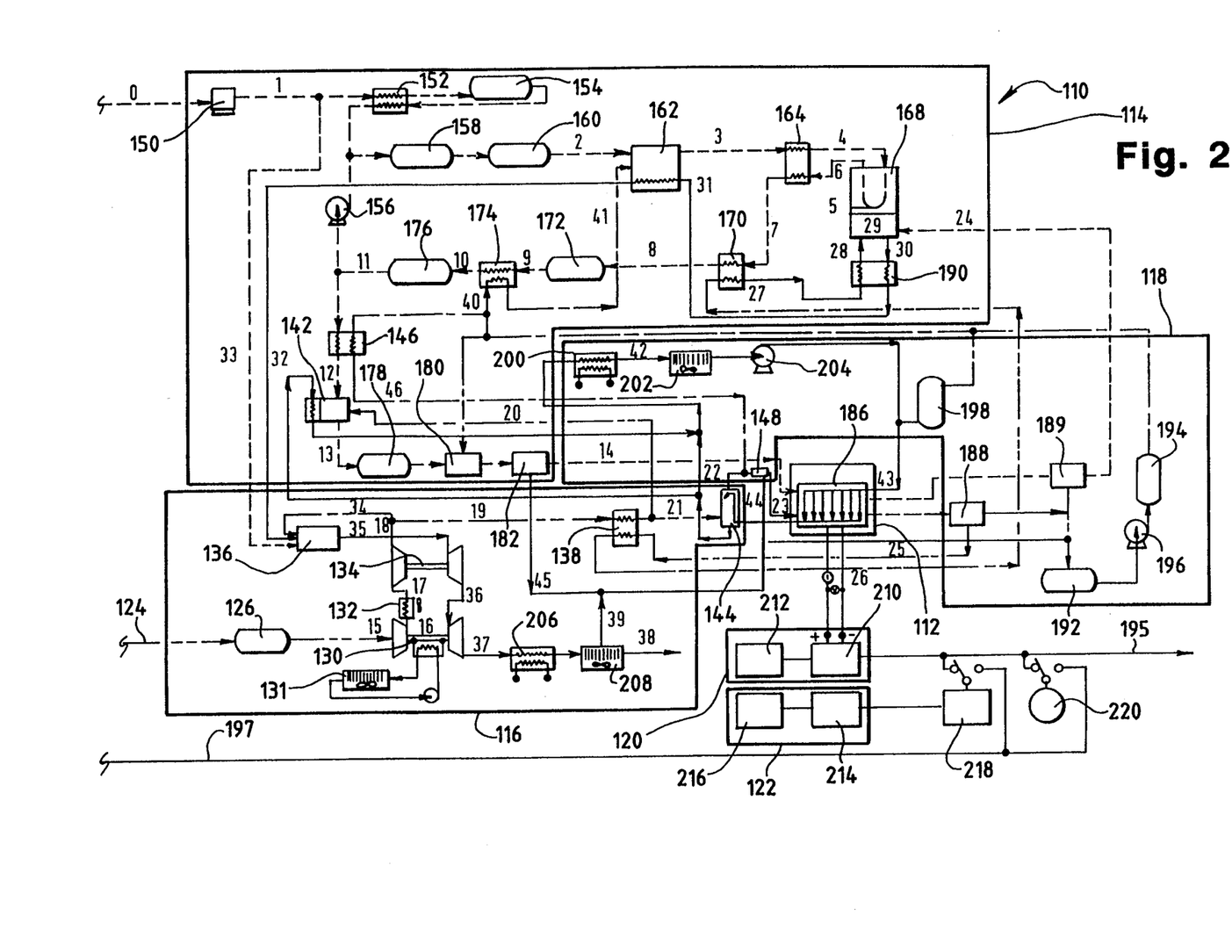
FIG. 2 is the schematic flow diagram of FIG. 1 in which the system components are grouped according to their six principal subsystems.

Referring first to FIG. 2, the six principal subsystems of the integrated hydrocarbon fueled solid polymer fuel cell electric power generation system 110 of the present invention are illustrated. The power generation system 110 includes:

(1) an electric power generation subsystem 112 for producing electricity and water from a hydrogen-containing fuel and pressurized air;

(2) a fuel processing subsystem 114 for producing a hydrogen-rich fuel for the electric power generation subsystem (3) an air pressurization subsystem 116 for delivering pressurized air to the electric power generation subsystem, (4) a water recovery subsystem 118 for recovering the water produced in the electric power generation subsystem and optionally for cooling the electric power generation subsystem, (5) a power conversion subsystem 120 for converting the electricity produced into utility grade electricity, and (6) a controller subsystem 122 for monitoring and controlling the supply of fuel and oxidant to the electric power generation subsystem.

Figure 1:
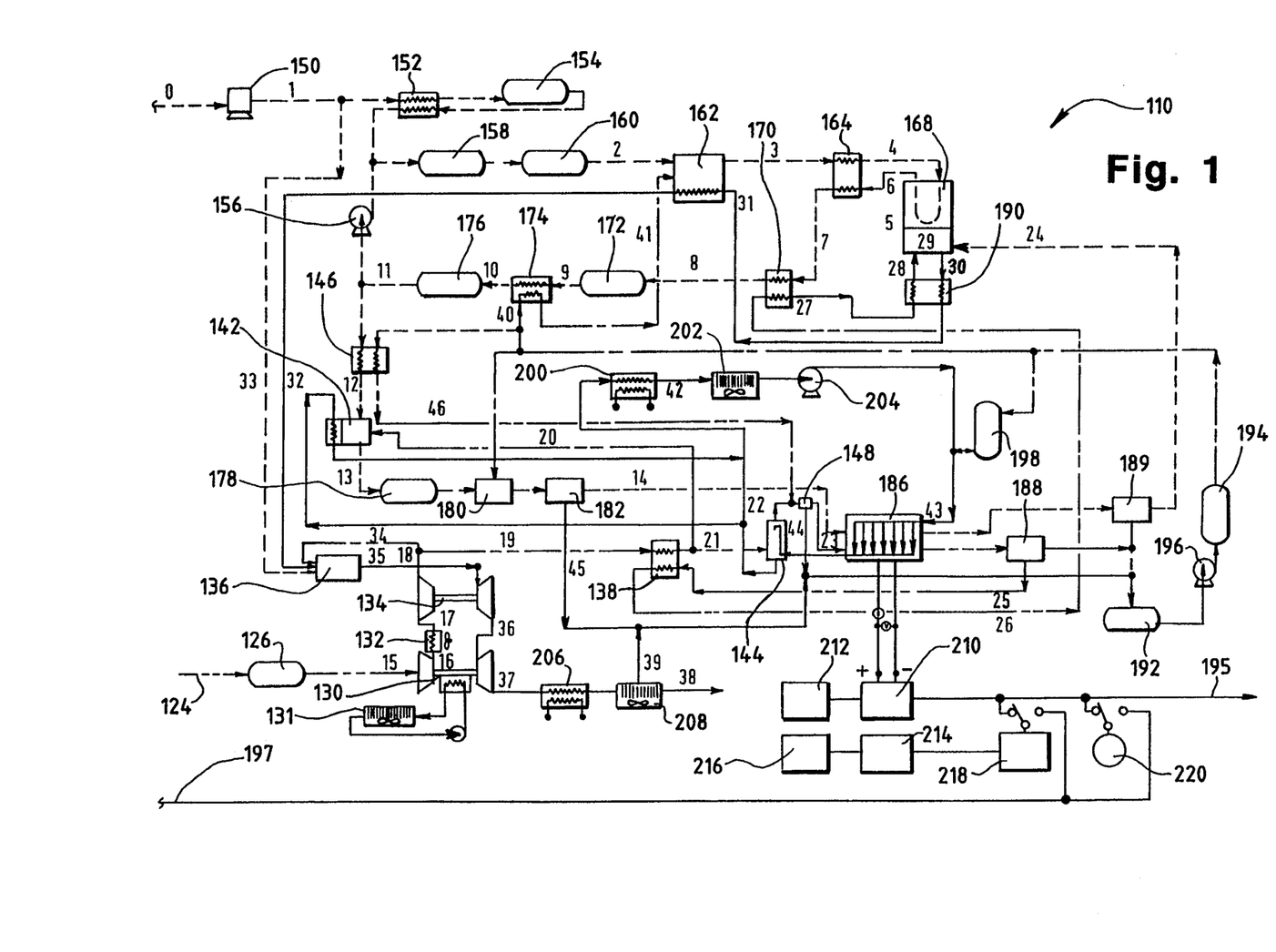
FIG. 1 is a schematic flow diagram of a solid polymer fuel cell electric power generation system according to the present invention.

In the preferred embodiment, illustrated in detail in FIG. 1, an air stream 124 enters the air pressurization subsystem 116 through a conduit and passes through a filter 126 to remove impurities. The filtered air stream 15 enters the first stage 130 of a two-stage turbocompressor to produce a pressurized air stream 16 having a pressure of approximately 20 psig. The bearing oil associated with first stage 130 of the staged turbocompressor is cooled by circulating the oil through turbocompressor bearing oil cooler 131, as shown in FIG. 1. The increased pressure of the air stream 16 exiting the first stage 130 causes its temperature to rise to approximately 251° F. The pressurized air stream 16 passes through a compressor intercooler 132, and exits as air stream 17 having a temperature of approximately 140° F. for more efficient compression. The cooled pressurized air stream 17 is then delivered to the second stage 134 of the two-stage turbocompressor, where the stream is further pressurized and exits as air stream 18 having a pressure of approximately 65 psig and a temperature to approximately 344° F. A small amount of the pressurized air stream 18 exiting the second stage 134 of the two-stage turbocompressor is diverted via air stream 34 to an auxiliary burner 136 to provide occasional auxiliary energy to drive the turbine portion of the two-stage turbocompressor, as described more fully hereinafter. The remainder of the pressurized air stream 18 exiting the second stage 134 of the two-stage turbocompressors is directed via air stream 19 to a cathode precooler 138. The air stream 21 exiting cathode precooler 138 has a temperature of approximately 210° F. A small amount of the pressurized, cooled air stream exiting cathode precooler 138 is diverted to a selective oxidizer 142, where it serves as the oxidant source. Selective oxidizer 142 is a component of the fuel processing subsystem 114. The remainder of the pressurized, cooled air stream exiting cathode precooler 138 is directed via air stream 21 to a contact humidifier 144. In the contact humidifier 144, the pressurized air stream 21 absorbs coolant water generated in the electric power generation subsystem 112 (see FIG. 2) to humidify (impart water vapor to) the air stream 21. The cooled, humidified air stream 22 exiting the contact humidifier 144 is further humidified with steam 46 from a selective oxidizer precooler 146, and the humidified air stream is then passed through a trap 148, to capture and remove any water droplets entrained in the stream. The pressurized, humidified air stream 23 is then introduced to the cathode(s) of the fuel cell stack 186. Water stream 44 from the trap 148 is directed to a water tank 192, which is a component of the water recovery subsystem 118 (see FIG. 2).

As illustrated in FIG. 2, the fuel processing subsystem 114 processes raw fuel stream into a hydrogen-rich fuel stream and delivers the processed fuel stream to the anode(s) of the fuel cell stack 186. In the preferred embodiment illustrated in detail in FIG. 1, the raw fuel stream 0, consisting of natural gas, enters the fuel processing subsystem 114 through a conduit and then passes through a compressor 150. The compressed fuel stream 1 exiting the compressor 150 has a pressure of approximately 100 psig and a temperature of approximately 522° F. The pressurized fuel stream 1 is directed through a preoxidizer cooler 152, then passed through a preoxidizer 154, where oxygen from peak shave gas is consumed. Peak shave gas is a mixture of air and propane occasionally added to natural gas during peak demand periods. If propane or natural gas containing no oxygen is used as the raw fuel source in the present power generation system, rather than natural gas, then the preoxidizer 154 need not be employed. The pressurized fuel stream exiting the preoxidizer 154 passes through preoxidizer cooler 152. The fuel stream which then exits preoxidizer cooler 152 is mixed with a small amount of the hydrogen-rich gas stream recycled from a hydrogen recycle compressor 156. The mixed fuel/hydrogen stream is then passed through a hydrodesulfurizer 158, where sulfur is removed from the stream. The hydrodesulfurizer 158 contains a catalyst which causes sulphur to react with the hydrogen to form hydrogen sulfide. In the hydrodesulfurizer 158, the hydrogen sulfide is passed over a bed of zinc oxide, and reacts with the hydrogen sulfide gas to form solid zinc sulfide and water. The chemical equations associated with the hydrodesulfurizer 158 are:

$$H_2 + S \rightarrow H_2S \tag{1}$$

$$H_2S + ZnO \rightarrow ZnS(s) + H_2O \tag{2}$$

In some circumstances, the hydrodesulfurizer can be replaced by an activated charcoal bed.

The fuel stream exiting the hydrodesulfurizer 158, which comprises the desulfurized fuel and hydrogen-rich gas, then passes through the hydrogenator 160. In the hydrogenator 160, the stream is directed through a bed of hydrogenation catalyst so that unsaturated gases in the fuel stream are saturated with the recycled hydrogen.

The fuel stream 2 exiting the hydrogenator 160 is then directed through an evaporator 162, where the stream is mixed with a fine spray from the water stream 41 recycled from the water recovery subsystem 118 (see FIG. 2). In a preferred embodiment, the evaporator 162 is a co-current flow vaporizer having a low pressure drop design. The humidified fuel stream 3 exits evaporator 162 at about 335° F., so that the water entrained in the stream is substantially completely vaporized. The heat energy for evaporator 162 is supplied by the burner exhaust stream 31 recycled from reformer burner 29. The humidified fuel stream 3 exiting evaporator 162 is then directed through a regenerator heat exchanger 164 and exits regenerator heat exchanger 164 at a temperature of approximately 650° F. The fuel stream 4 exiting the regenerator heat exchanger 164 is then introduced into a reformer 168. The heat energy for reformer 168 is supplied by the reformer burner 29. Reformer 168 operates at approximately 1370° F. to produce a hydrogen-rich reformate fuel gas stream 5 containing carbon dioxide, carbon monoxide, natural gas and water vapor. The reformate fuel stream 6 exits the reformer 168 at approximately 850° F., and is then passed through the regenerator heat exchanger 164, and exits regenerator heat exchanger 164 at approximately 584° F. The reformate fuel stream 7 exiting the regenerator heat exchanger 164 is passed through a shift reactor precooler 170 and exits precooler 170 at approximately 380° F.

The reformate fuel stream 8 exiting the shift reactor precooler 170 is then directed to the first stage 172 of a two-stage shift reactor convertor, in which a catalyst (preferably a copper-containing composition) exothermically converts the carbon monoxide in the reformate fuel stream 8 into carbon dioxide and hydrogen, according to the chemical equation:

$$CO + H_2O \rightarrow CO_2 + H_2 \tag{3}$$

A feedwater preheater 174 acts as a shift reactor intercooler to bring the temperature of the reformate fuel stream 9 exiting the first stage 172 of the two-stage shift reactor convertor to approximately 380° F. The reformate fuel stream 10 exiting the feedwater preheater 174 is then directed to the second stage 176 of the two-stage shift reactor convertor, in which another catalyst is preferably employed to convert carbon monoxide remaining in the reformate fuel stream 10 into carbon dioxide and hydrogen. A small amount of hydrogen from the reformate fuel stream 11 exiting the second stage 176 of the two-stage shift reactor convertor is directed to a hydrogen recycle compressor 156 for delivery into the fuel stream upstream from the hydrodesulfurizer 158. The remainder of the reformate fuel stream 11 exiting the second stage 176 of the two-stage shift reactor convertor is directed through the selective oxidizer precooler 146. The selective oxidizer precooler 146 cools the reformate fuel stream 11 to approximately 280° F., and the cooled reformate fuel stream 12 exiting the selective oxidizer precooler 146 is then directed through a selective oxidizer 142.

In another preferred embodiment, the reformate fuel stream 8 exiting the shift reactor precooler 170 is directed to the first stage 172 of the two-stage shift reactor convertor and then directly to the second stage 176 before being directed to the feedwater preheater 174. Second stage 176 is most preferably a progressively cooled shift reactor. Such a two-stage shift reactor converter arrangement reduces the concentration of carbon monoxide in reformate fuel stream 8 to about 0.1–0.2% by volume.

In the selective oxidizer 142, the reformate fuel stream 112 is mixed with air from air stream 20 from the cathode precooler 138 to convert the carbon monoxide remaining in the reformate fuel stream 12 into carbon dioxide. A fuel filter 178 removes entrained catalyst particles from the reformate fuel stream 13 exiting the selective oxidizer 142. The reformate fuel stream 13 exiting the filter 178 is then directed to an anode precooler 180. The anode precooler 180 cools the fuel stream 13 to substantially the same temperature as the fuel cell stack 186 by spraying it with water from water stream 40 recycled from the water recovery subsystem 118. Before being fed to the fuel cell stack 186, water is separated from the processed fuel stream 13 in a water separator 182. The reformate fuel stream 14 exiting the water separator 182 is introduced into the anode(s) of the fuel cell stack 186. The water stream 45 exiting the water separator 182 is directed to the water tank 192 in the water recovery subsystem 118.

As illustrated in FIG. 2, the electric power generation subsystem 112 generally comprises a fuel cell stack 186, which in turn comprises a plurality of fuel cells connected in series electrical circuit through a load. In the preferred embodiment, each fuel cell comprises a solid polymer electrolyte ion exchange membrane disposed between each anode and cathode, each of which is preferably formed of carbon fiber paper. A catalyst, preferably platinum, is disposed between the membrane and the electrodes. The solid polymer membrane is preferably a perfluorosulfonic ion exchange membrane, such as those commercially available from DuPont under its Nafion trade designation or the experimental perfluorosulfonic ion exchange membrane available from Dow under the trade designation XUS 13204.10. The membrane serves simultaneously as a proton conductor, an electron insulator and a gas separator.

The use of a solid polymer membrane offers several advantages over the use of liquid phosphoric acid electrolyte in solid polymer fuel cell electric power generation systems. Solid polymer membranes have high cross-pressure capability, making it unnecessary to employ the expensive or complicated equipment or techniques employed in liquid electrolyte fuel cells to control cell cross-pressure between each anode and cathode. Solid polymer fuel cell operate at much lower temperatures (185° F.), so that water generated in the fuel cell may be accumulated, removed and recovered using relatively simple water separation equipment rather than the large and expensive water condensing devices typically employed in phosphoric acid electrolyte fuel cells. Moreover, the lower operating temperature of solid polymer fuel cells results in a substantially pure water reaction product, rather than the acid leach typical of phosphoric acid fuel cells, thereby minimizing damage to the fuel cell components from acid corrosion and eliminating the need for expensive water purification equipment.

In operation, the water generated as a reaction product in the electrochemical fuel cells exits from the fuel cell stack 186 entrained with the cathode exhaust stream. The anode exhaust stream exiting the fuel cell stack 186 also contains water vapor as a consequence of the humidification of the fuel stream prior to its introduction into the reformer 168.

As shown in FIG. 1, the cathode exhaust stream exiting the fuel cell stack 186 is directed through a water separator 188 to remove the water entrained in the cathode exhaust stream. The water so removed is collected in the water tank 192 for use in the water recovery subsystem 118. The dewatered cathode exhaust stream 25 exiting water separator 188 is then directed through the cathode precooler 138. The exhaust stream 26 exits cathode precooler 138 at a temperature of approximately 319° F., simultaneously cooling the air stream 19 of the air pressurization subsystem 116 directed through the cathode precooler 138. The cathode exhaust stream 26 is then directed through shift reactor precooler 170, where it cools the reformed fuel stream 7 from the fuel processing subsystem 114. The cathode exhaust stream 27 exits shift reactor precooler 170 at a temperature of approximately 447° F. Cathode exhaust stream 27 is then directed through cathode vent gas preheater 190. The cathode exhaust stream 28 exits the cathode vent gas preheater at a temperature of approximately 650° F. Cathode exhaust stream 28 is then directed to the reformer burner 29, where it is burned along with anode exhaust stream 24 to provide heat energy for the reformer 168. A second cathode vent gas preheater can be added before preheated 190 to increase the burner flame temperature for more efficient reforming.

Upon expulsion from the fuel cell stack 186, the anode exhaust stream 24 is directed through a water separator 189, so that water entrained in the anode exhaust stream 24 can be recycled in the water recovery subsystem 118, in a manner similar to that described above for the cathode exhaust stream 27. The dewatered anode exhaust stream 24 is then directed into the reformer burner 29, where it is burned with the preheated cathode exhaust stream 28 to provide heat energy for the reformer 168. The resulting burner exhaust stream 30 is cooled in the cathode vent gas preheater 190, where it simultaneously preheats the cathode exhaust stream 27 prior to its introduction to the reformer burner 29. The cooled burner exhaust stream 31 is then directed to the evaporator 162, where it provides heat energy to vaporize the feedwater stream 41 exiting the feedwater preheater 174 for subsequent combination with the fuel stream 2 in the evaporator 162. The cooled burner exhaust stream 32 is then directed to the auxiliary burner 136, where it provides heat energy for the turbine portion of the two-stage turbocompressors 134, 130 used to produce the pressurized air stream 18, 19 directed to the cathode(s) of fuel cell stack 186. At full power, the exhaust stream 32 from the reformer burner 29 supplies all the energy required by the turbines to power the turbocompressors 130, 134, without the need to employ auxiliary burner 136. During start-up and during less than full power conditions, however, it may be necessary to supplement the reformer burner exhaust stream 32 with energy from the combustion of raw fuel stream 33 and auxiliary burner air stream 34 in auxiliary burner 136, to provide sufficient heat energy to drive the turbine portions of turbocompressors 130, 134.

Exhaust stream 35 exiting the auxiliary burner 136 is directed through the two-stage turbocompressors 130, 134, where the stream 37 exiting the turbocompressors is cooled to 390° F. The exhaust stream 36 exiting the turbine portion of turbocompressor 134 is immediately introduced into the turbine portion of turbocompressor 130. The cooled exhaust stream 37 exiting the turbine portion of turbocompressor 130 is then directed to a high grade heat exchanger 206, where it generates steam, and then to a water recovery heat exchanger 208, where a liquid water stream 39 is recaptured and directed to be recycled, together with the condensed water stream 45 from water separator 182, in the water recovery subsystem 118. The cooled excess auxiliary burner exhaust stream 38 is then expelled from the system.

As further illustrated in FIG. 1, the water recovery subsystem 118 recycles the water separated from both the anode exhaust stream 24 and the cathode exhaust stream 27, and provides water to the following subsystems:

(a) the electric power generation subsystem 112 for cooling the fuel cell stack;

(b) the fuel processing subsystem 114 for use in the hydrocarbon reforming process and for humidifying the fuel stream fed to the fuel cell stack 186; and (c) the air pressurization subsystem 116 for humidifying the oxidant stream fed to the fuel cell stack 186.

A water tank 192, collects the water separated from the anode exhaust stream 24 in water separator 189 and the cathode exhaust stream 27 in water separator 188. Tank 192 accumulates the water until it is required by any of the subsystems of the present integrated power plant system. When so required, the water stream is pumped from the tank 192 by a feedwater pump 196 and through a charcoal bed 194 to remove impurities. The purified water stream 40 is then directed as needed to:

(a) the coolant accumulator 198 for use in the coolant loop of the fuel cell stack 186 (depicted in FIG. 1 by the arrows in stack 186);

(b) the anode precooler 180 for use in cooling the reformate fuel stream 13;

(c) the selective oxidizer precooler 146 to generate steam for humidifying the fuel stream 22 eventually fed to the fuel cell stack 186; and/or (d) the feedwater preheater 174 for subsequent introduction to the evaporator 162 for use in the steam reformation process.

The coolant stream from the coolant pump 204 is directed via stream 43 through the internal coolant loop within the fuel cell stack 186 to control the temperature of the stack. The coolant water exiting the fuel cell stack 186 is fed to the contact humidifier 144 for humidification of the pressurized air stream 21 prior to introducing the oxygen-containing air stream to the cathode(s) of the fuel cell stack 186. A portion of the coolant water stream exiting contact humidifier 144 is then directed to the selective oxidizer 142. The coolant water stream exiting the selective oxidizer 142 then rejoins the remainder of the coolant water stream exiting the contact humidifier 144, and is directed to a low grade heat exchanger 200, where it is cooled. The coolant water exiting low grade heat exchanger 200 passes through a thermal control heat exchanger 202, where the stream 42 is further cooled to a temperature of approximately 165° F., after which the coolant water stream is returned to the fuel cell stack 186 using a coolant pump 204. A coolant accumulator 198 upstream of the fuel cell stack 186 acts as a reservoir for coolant expansion with temperature rise and accepts make-up water from the feedwater pump 196.

Water directed from the water tank 192 to the anode precooler 180 is used to cool the reformed fuel stream 13. Before the fuel stream 13 is introduced into the anode(s) of the fuel cell stack 186, the water is separated from the fuel stream 13 in the water separator 182, and then returned via stream 45 to the water tank 192.

Water stream 46 directed from the selective oxidizer precooler 146 is transformed into steam to humidify the pressurized air stream 22 to the desirable level prior to its introduction to the cathode(s) of the fuel cell stack 186. A water stream 44 is then recovered in the trap 148 and returned to the water tank 192. Water from stream 40 fed to the feedwater preheater 174 is heated to approximately 311° F., then directed to the evaporator 162, where the stream 41 is combined with fuel stream 2 to participate in the reformation process.

Electric power generated by the fuel cell stack 186 is converted into utility grade power in the power conversion subsystem 120 (see FIG. 2). In FIG. 1, line 197 represents the utility line and line 195 represents the AC power output line. The power conversion subsystem 120 comprises an inverter 210, which converts the DC power produced in the fuel cell stack 186 to utility grade AC power. The inverter 210 is supported by a battery peaking unit 212, which is connected to the inverter to augment the fuel cell stack voltage during rapid transient to maximum load, at least until the fuel processing subsystem 114 (see FIG. 2) and the air pressurization subsystem 116 (see FIG. 2) return the fuel cell stack 186 to full voltage and power capability. A typical situation requiring the battery peaking unit 212 would be an instantaneous up-load demand from a low power demand condition. During periods of low power demand from the load, the system is partially depressurized to conserve the amount of energy supplied to the two-stage turbocompressors 130, 134. The air pressurization subsystem 116 (see FIG. 2) requires a finite period of time to increase the pressure of the air stream 23 to the fuel cell stack 186. Until sufficient pressure is achieved, the stack voltage will be momentarily too low to satisfy the input voltage requirement of inverter 210. The battery peaking unit 212 provides the supplemental power required by the inverter 210 until the air pressurization subsystem 116 (see FIG. 2) provides the pressurized oxidant flow to fuel cell stack 186 necessary to independently satisfy the higher load demand. The use of the battery peaking unit 212 simplifies the control strategy of the power plant system 110 and permits high system electric efficiency at partial power when the power plant is employed to follow rapid up-load demands.

Controller subsystem 212 (see FIG. 2) comprises a controller 214 and cabinet systems 216. Controller 214 comprises the electronic and mechanical components, such as thermocouples, pressure transducers, mass flow measuring devices, information processing circuitry, and responsive valves and shut-down mechanisms, to control the operation of power plant system 110 in a balanced, integrated manner. Cabinet systems 216 include the gauges, instruments and switches necessary or desirable for operators to monitor and control the operation of power plant system 110.

Hotel load 218 represents the electric power required by the various electric power-consuming components of power plant system 110 in producing electric power. Fuel processor motor 220 is the motor associated with compressor 150. Motor 220 is also representative of the motors for other pumps and blowers in the system.

Figure 3A:
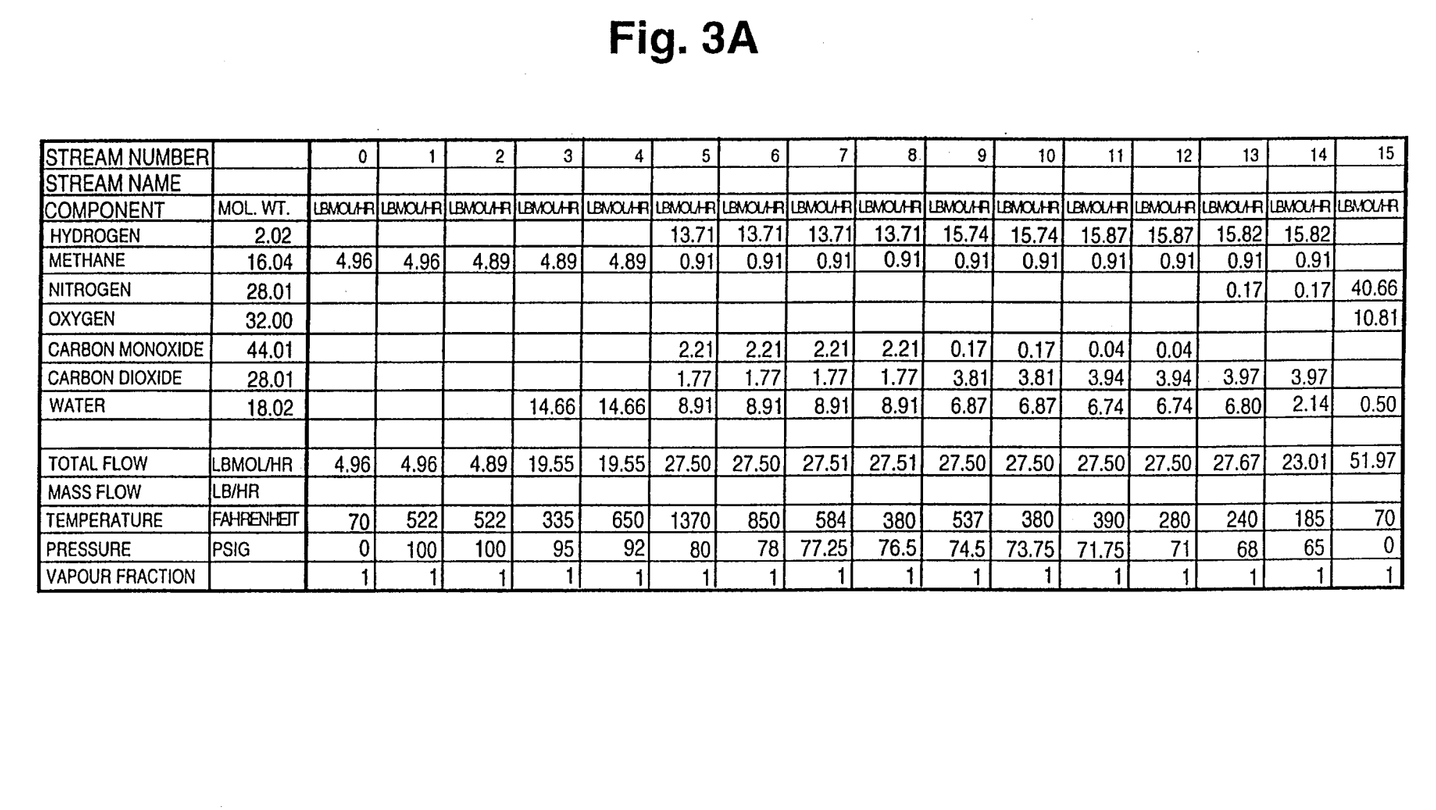
FIGS. 3A, 3B and 3C are tables showing the composition by percentage, volumetric and mass flow rates, temperature, pressure and vapor fraction of numbered streams 0-15 (in the case of FIG. 3A), streams 16-31 (in the case of FIG. 3B) and streams 32-46 (in the case of FIG. 3C) illustrated schematically in FIG. 1.
Figure 3B:
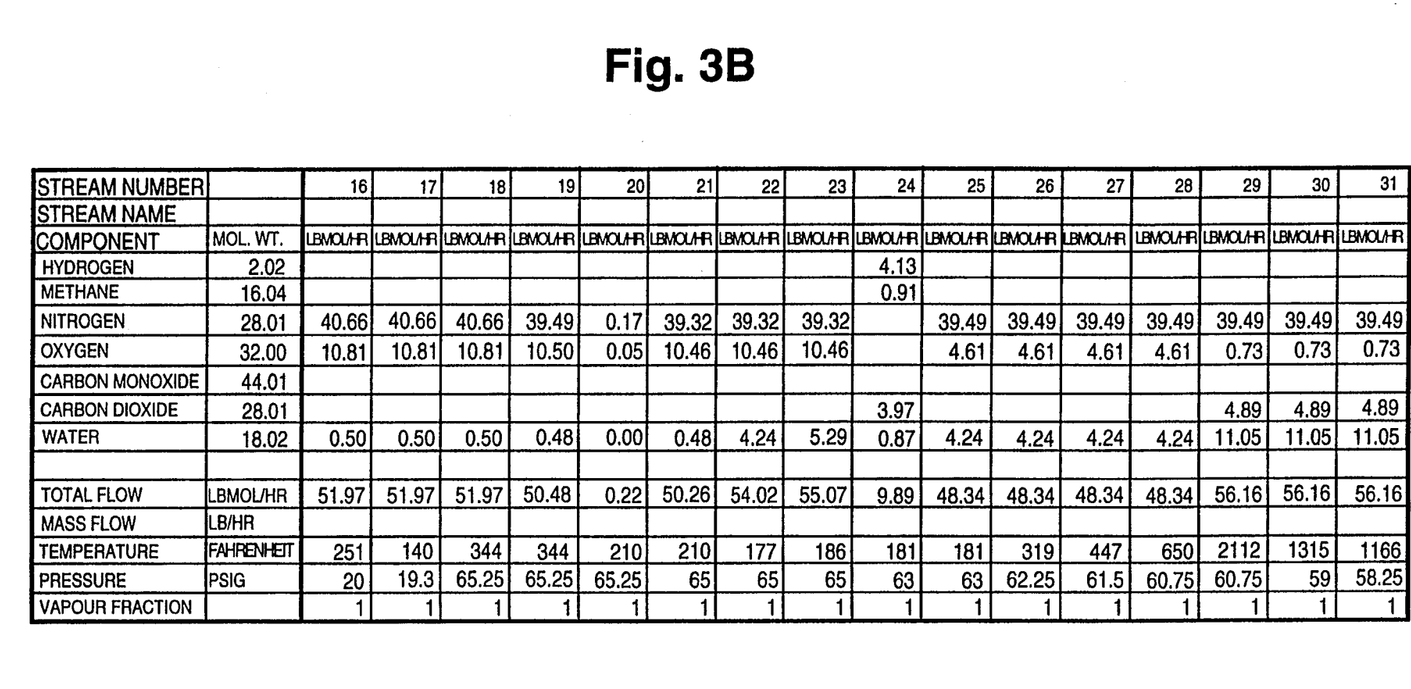
Figure 3C:
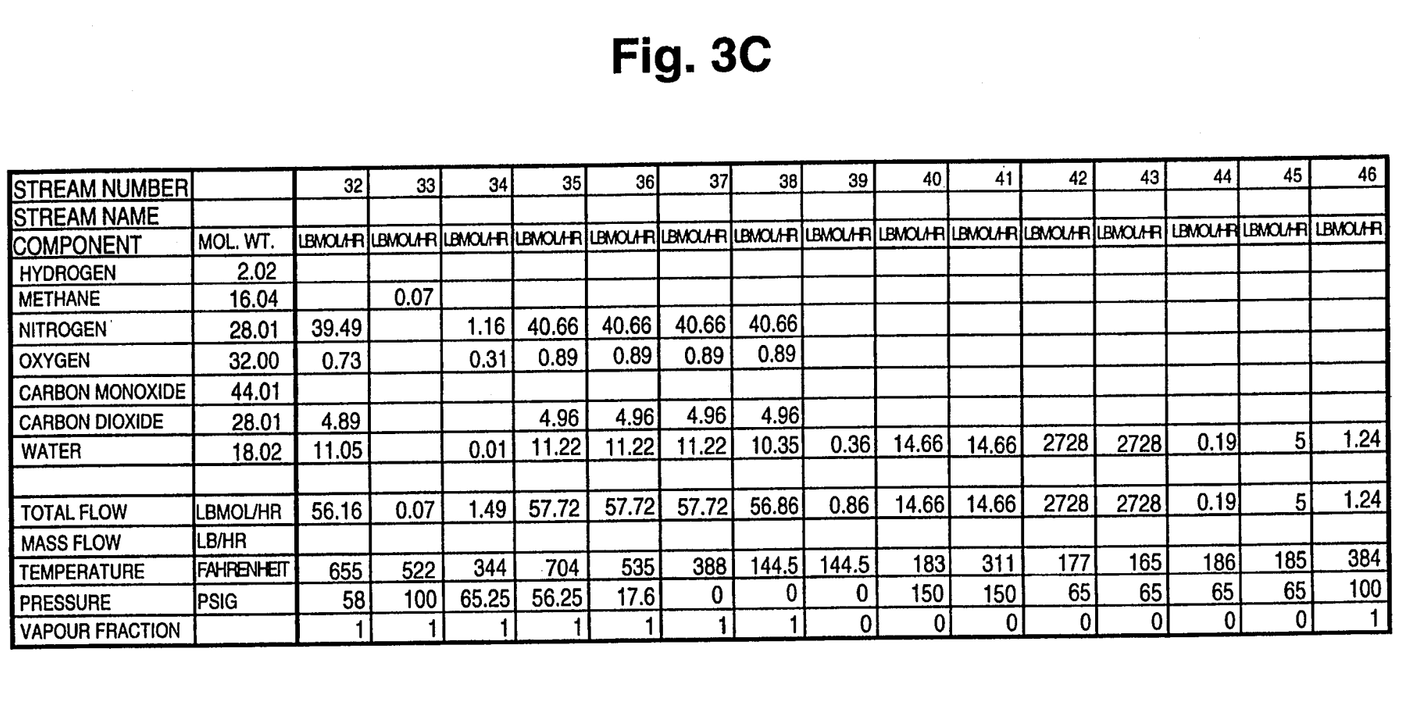

FIGS. 3A, 3B and 3C are tables showing the approximate composition by percentage, volumetric and mass flow rates, temperature, pressure and vapor fraction of numbered streams 0-46 in the power plant system illustrated schematically in FIG. 1. In FIGS. 3A-C, a vapor fraction of "0" means that the stream is gaseous; a vapor fraction of "1" means that the stream is liquid.

Figure 4:
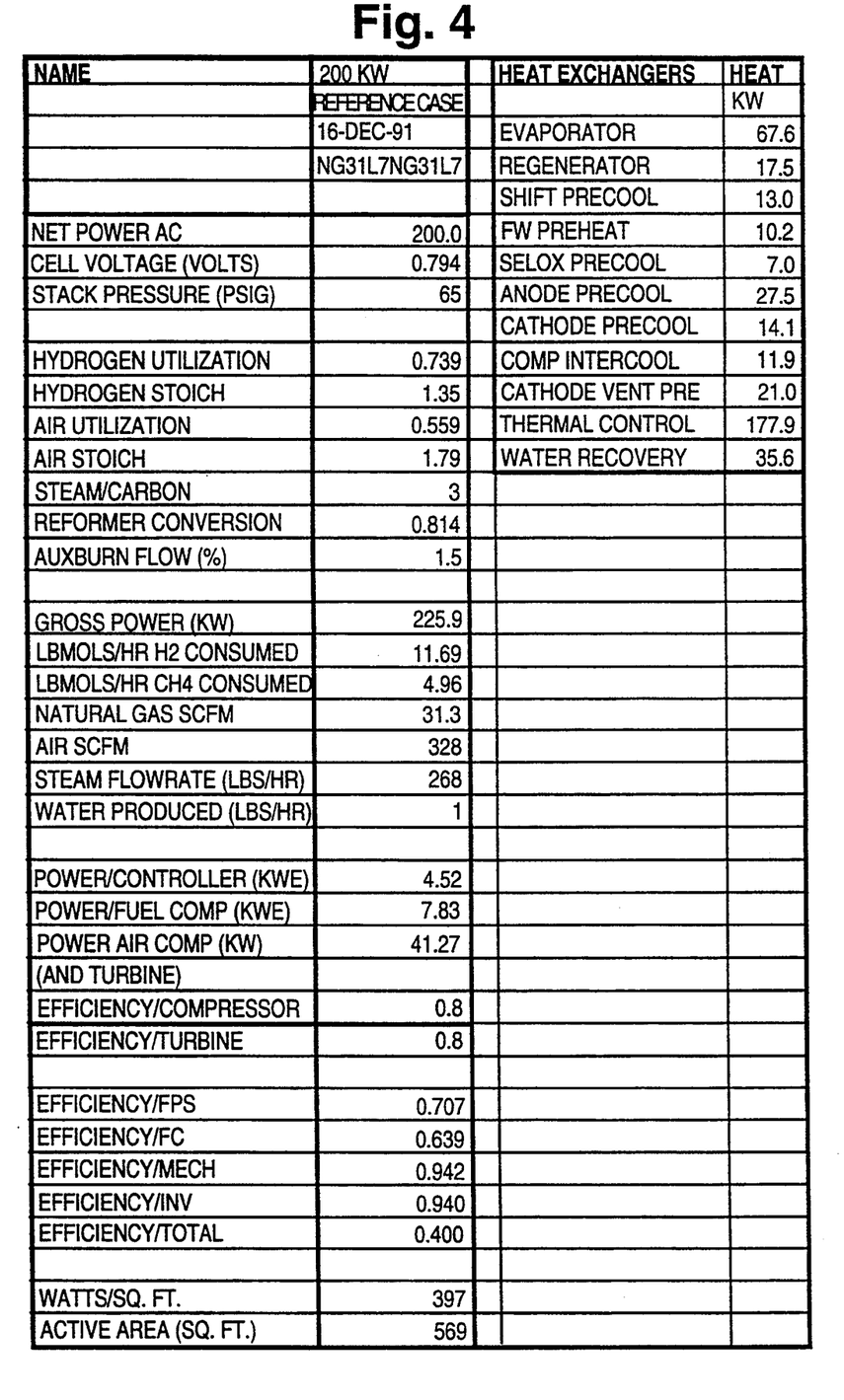
FIG. 4 is a table showing the operating parameters at full power of the electric power generation system illustrated in FIG. 1.

FIG. 4 is a table showing the operating parameters at full power of the electric power generation system illustrated in FIG. 1. The overall resulting system electric efficiency is about 40%.

While particular elements, embodiments and applications of the present invention have been shown and described, it will be understood, of course, that the invention is not limited thereto since modifications may be made by those skilled in the art, particularly in light of the foregoing teachings. It is therefore contemplated by the appended claims to cover such modifications as incorporate those features which come within the spirit and scope of the invention.

What is claimed is:

1. An integrated fuel cell electric power generation system comprising:
   a fuel processing subsystem for catalytically converting an inlet fuel stream comprising hydrocarbons to a processed fuel stream comprising hydrogen, said fuel processing subsystem comprising an evaporator for vaporizing water to humidify said inlet fuel stream, and a reformer comprising a reformer burner fed by at least one reactant exhaust stream, said reformer producing said processed fuel stream and said reformer burner producing a burner exhaust stream;
   an electric power generation subsystem comprising at least one fuel cell and at least one reactant exhaust stream, said at least one fuel cell comprising a cathode, an anode, and an ion exchange membrane disposed therebetween, said anode having a catalyst associated therewith for producing cations from said processed fuel stream, said cathode having a catalyst associated therewith for promoting the reaction of oxygen from a pressurized oxidant stream to form electricity, water and heat, said at least one reactant exhaust stream comprising unreacted hydrogen or unreacted oxygen or both;
   an air pressurization subsystem comprising a compressor operably connected to a turbine, said turbine being powered by a heated gas stream, said compressor pressurizing an oxidant stream for feeding said electric power generation subsystem; and
   a water recovery subsystem for recycling the water produced in said fuel cell stack, said water recovery subsystem comprising means for producing a separated water stream by removing water from said reactant exhaust stream, means for supplying a first portion of said separated water stream to said evaporator in said fuel processing subsystem, and means for supplying a second portion of said separated water stream to humidify said pressurized oxidant stream.

2. The integrated fuel cell electric power generation system of claim 1 wherein said at least one fuel cell comprises a plurality of fuel cells arranged as a stack.

3. The integrated fuel cell electric power generation system of claim 1 wherein said heated gas stream comprises said burner exhaust stream.

4. The integrated fuel cell electric power generation system of claim 1 wherein said water recovery subsystem further comprises means for supplying a third portion of said separated water stream to provide a coolant water circulation loop for said at least one fuel cell.

5. The integrated fuel cell electric power generation system of claim 4, further comprising a contact humidifier associated with said coolant loop for dispersing coolant water into said pressurized oxidant stream prior to introducing said pressurized oxidant stream to said cathode.

6. The integrated fuel cell electric power generation system of claim 5, further comprising a selective oxidizer disposed downstream of said contact humidifier, said selective oxidizer for receiving at least some excess coolant water from said contact humidifier to cool the fuel stream processed by said selective oxidizer prior to introducing said processed fuel stream to said anode.

7. The integrated fuel cell electric power generation system of claim 1 wherein said at least one reactant exhaust stream comprises two reactant exhaust streams, one of which comprises unreacted hydrogen and the other of which comprises unreacted oxygen.

8. The integrated fuel cell electric power generation system of claim 1, wherein said water recovery subsystem further comprises:
   means for storing the water separated from said power exhaust stream; and
   means for delivering said separated water from said storing means to said purifying means.

9. The integrated fuel cell electric power generation system of claim 8, wherein said water recovery subsystem further comprises:
   means for purifying the separated water downstream of said storing means.

10. The integrated fuel cell electric power generation system of claim 1, wherein said means for separating the water comprises a first water separator disposed downstream of said anode and upstream of said reformer burner, and a second water separator disposed downstream of said cathode and upstream of said reformer burner.

11. The integrated fuel cell electric power generation system of claim 1, wherein said compressor comprises staged turbines of staged turbocompressors, said turbines being driven at least in part by an auxiliary burner, said auxiliary burner receiving said burner exhaust stream, at least a portion of said pressurized oxidant stream, and at least a portion of said inlet fuel stream, said turbocompressors pressurizing said oxidant stream.

12. The integrated fuel cell electric power generation system of claim 1, wherein said electricity produced from said electric power generation subsystem is converted into utility grade AC power, said conversion means comprising an inverter augmented by a battery peaking unit.

13. The integrated fuel cell electric power generation system of claim 12, wherein said battery peaking unit is connected in parallel to said fuel cell to supply power to said inverter when said fuel cell voltage is decreased below a minimum voltage required by said inverter.

* * * * *

UNITED STATES PATENT AND TRADEMARK OFFICE
CERTIFICATE OF CORRECTION

PATENT NO. : 5,360,679
DATED : November 1, 1994
INVENTOR(S) : Buswell et al.

It is certified that error appears in the above-indentified patent and that said Letters Patent is hereby corrected as shown below:

In The Drawings:

Sheets 3, 4, 5 of 6 (Figure 3A, 3B, 3C) -- Molecular Weight of Carbon Monoxide is 28.01 and Molecular Weight of Carbon Dioxide is 44.01.

Column 9, line 15, "112" should read --12--.

Column 12, line 58, "212" should read --122--.

Column 13, line 12, "gaseous" should read --liquid--.

Column 13, line 13, "liquid" should read --vapor--.

Signed and Sealed this

Sixth Day of June, 1995

Attest:

BRUCE LEHMAN

Attesting Officer     Commissioner of Patents and Trademarks